United States Patent
McLaughlin et al.

(10) Patent No.: US 11,681,278 B2
(45) Date of Patent: Jun. 20, 2023

(54) HIGH AVAILABILITY FOR CONTAINER BASED CONTROL EXECUTION

(71) Applicant: HONEYWELL INTERNATIONAL, INC., Morris Plains, NJ (US)

(72) Inventors: Paul F. McLaughlin, Ambler, PA (US); James M. Schreder, Perkasie, PA (US); Joseph Felix, Coopersburg, PA (US)

(73) Assignee: Honeywell International Inc., Charlotte, NC (US)

( * ) Notice: Subject to any disclaimer, the term of this patent is extended or adjusted under 35 U.S.C. 154(b) by 204 days.

(21) Appl. No.: 16/446,125

(22) Filed: Jun. 19, 2019

(65) Prior Publication Data
US 2020/0401116 A1 Dec. 24, 2020

(51) Int. Cl.
*G05B 19/418* (2006.01)
*G06F 21/53* (2013.01)

(52) U.S. Cl.
CPC ..... *G05B 19/4185* (2013.01); *G05B 19/4184* (2013.01); *G05B 19/41845* (2013.01); *G06F 21/53* (2013.01)

(58) Field of Classification Search
CPC ............ G05B 19/4185; G05B 19/4184; G05B 19/41845; G05B 19/4183; G05B 9/03; G06F 21/53; G06F 9/5044; G06F 9/5055; G06F 11/3433; G06F 2201/815; G06F 11/2028; G06F 11/2097; G06F 11/2017; G06F 11/2033; G06F 11/2007; G06F 11/2005; Y02P 90/02; Y02P 90/80

USPC .......................................................... 700/82
See application file for complete search history.

(56) References Cited

U.S. PATENT DOCUMENTS

| | | |
|---|---|---|
| 5,546,301 A | 8/1996 | Agrawl et al. |
| 6,138,049 A | 10/2000 | McLaughlin et al. |
| 6,272,386 B1 | 8/2001 | McLaughlin et al. |
| 7,313,448 B2 | 12/2007 | Detrich et al. |
| 7,630,777 B2 | 12/2009 | Rudnick et al. |
| 9,665,089 B2 | 5/2017 | Schreder et al. |
| 2014/0032366 A1* | 1/2014 | Spitz ............... G06Q 30/06 705/26.41 |
| 2014/0068579 A1* | 3/2014 | Dawson ............ G06F 9/45504 717/148 |
| 2014/0298091 A1 | 10/2014 | Carlen et al. |
| 2018/0046487 A1* | 2/2018 | Matters ............. G06F 9/45558 |
| 2018/0259923 A1 | 9/2018 | De et al. |

(Continued)

OTHER PUBLICATIONS

Goldschmidt et al: "Container-based architecture for flexible industrial control applications", Journal of Systems Architecture, vol. 84, Mar. 6, 2018 (Mar. 6, 2018), pp. 28-36, XP055516260, NL ISSN: 1383-7621, DOI: 10.1016/j.sysarc.2018.03.002.

(Continued)

*Primary Examiner* — Kenneth M Lo
*Assistant Examiner* — Mohammed Shafayet
(74) *Attorney, Agent, or Firm* — Paschall & Associates, LLC; James C. Paschall

(57) ABSTRACT

In an industrial automation system, a control device adapted to a container-based architecture has been developed. The control device may comprise one or more containers instantiated with control execution application, communication application, and or redundancy management application.

20 Claims, 10 Drawing Sheets

(56) References Cited

U.S. PATENT DOCUMENTS

2019/0102226 A1* 4/2019 Caldato ............... G06F 11/3644
2020/0104153 A1* 4/2020 Shibayama ........... G06F 9/5027
2020/0310394 A1* 10/2020 Wouhaybi ........... H04L 41/0846

OTHER PUBLICATIONS

Daniel et al: "Highly-Available Applications on Unreliable Infrastructure: Microservice Architectures in Practice", 2017 IEEE International Conference on Software Quality, Reliability and Security Companion (QRS-C), IEEE, Jul. 25, 2017 (Jul. 25, 2017), pp. 130-137, XP033139427, DOI: 10.1109/QRS-C.2017.28.
Extended European Search Report for corresponding EP Application No. 20180114.9.

* cited by examiner

HIGH AVAILABILITY FOR CONTAINER BASED CONTROL EXECUTION

TECHNICAL FIELD

This disclosure relates generally to industrial process control and automation systems. More specifically, this disclosure relates to an apparatus and method for adapting control execution, communication, and or redundancy management of control devices to a container-based architecture.

BACKGROUND

Industrial process control and automation systems are typically used to monitor and control complex and potentially volatile industrial processes without interruption, often running without scheduled downtime for years. Over time, a need may arise to upgrade one or more components in an industrial process control and automation system. This could be due to various factors, such as the desire to obtain improvements provided by new products or the need to replace obsolete products or address support issues. When one component of the industrial process control and automation system is upgraded, it is desirable to provide for compatibility with legacy technology. For example, a substantial base of controllers currently used in industrial process control and automation systems currently exists. It may be necessary to upgrade only a portion of existing controllers at a give time. It becomes desirable that the upgraded controllers and the legacy controllers work in harmony together within the industrial process control and automation system. This is especially true in distributed control systems (DCSs) with controllers that provide 1:1 redundancy to improve availability of the system when a primary controller fails. In such a system an upgraded controller may be paired in a redundant setting with a legacy controller. There is a need for upgraded controllers which retain compatibility with legacy controllers for use in industrial process control and automation systems.

SUMMARY

The disclosure involves a high availability industrial control automation system comprising: a set of nodes wherein each node comprises a processor configured with a platform supporting container architecture; each node comprising one or more containers instantiated with at least one application function selected from control execution, communication, and redundancy management; and a high availability management network connecting the platforms of the nodes in the set of nodes. The nodes may be a heterogeneous set of nodes. The set of nodes may comprise physical control devices and virtual servers. The system may further comprise a primary control network and a secondary control network wherein each node is connected to both the primary control network and the secondary control network. The system may further comprising a primary I/O network and a secondary I/O network wherein each node is connected to both the primary I/O network and the secondary I/O network. The at least a first container of a first node and a second container of a second node may be present in a redundant relationship. The platform may enable container runtime services to the containers.

The disclosure also involves a high availability industrial control method comprising: providing a set of nodes, each node comprising a processor configured with a platform supporting container architecture and each node comprising one or more containers instantiated with at least one application function selected from control execution, communication, and redundancy management, wherein each node is connected to a high availability management network; detecting a failure state of one or more nodes by communications though the high availability management network; identifying the containers assigned to the one or more nodes detected in a failure state; determining available capacity in the remaining nodes by communications though the high availability management network; redistributing the containers previously assigned to the one or more nodes detected in a failure state to one or more remaining nodes based on the determined available capacity; and automatically starting the redistributed containers. The method may further comprise detecting I/O connections assigned to the one or more nodes detected in a failure state and reassigning the I/O connections along with the redistributing of the containers. The set of nodes may be a heterogeneous set of nodes. The set of nodes may comprise both physical and virtual nodes. The containers may include redundant pairs of containers where each member of the pair is assigned to a different node. The method may further comprise determining which of the containers assigned to the one or more nodes detected in a failure state are primary containers in a redundant pair of a primary container and a secondary container and elevating the corresponding secondary container to function as a new primary container. The method may further comprise detecting a change in status of a node from a failure state and rebalancing the distribution of containers across nodes in a non-failure state. The determining available capacity may comprise communicating predetermined container requirements though the high availability management network. The automatically starting the redistributed containers may further comprise automatically synchronizing data from a remaining member of the redundant pair of containers.

The disclosure also involves a high availability industrial control method comprising: providing a set of nodes, each node comprising a processor configured with a platform supporting container architecture and each node comprising one or more containers instantiated with at least one application function selected from control execution, communication, and redundancy management, wherein each node is connected to a high availability management network; detecting a failure state of one or more containers by communications though the high availability management network; identifying the failed container assigned to the one or more nodes and identifying the capacity requirements of the failed container; determining available capacity in the nodes by communications though the high availability management network; redistributing the one or more failed containers to one or more nodes based on the determined available capacity and the capacity requirements of the one or more containers; and automatically starting and synchronizing the redistributed one or more containers. The set of nodes may comprise a heterogenous mixture of nodes. The method may further comprise detecting I/O connections assigned to the one or more containers detected in a failure state and reassigning the I/O connections along with the redistributing of the containers. The method may further comprise determining which of the one or more containers in a failure state are primary containers in a redundant pair of a primary container and a secondary container and elevating the corresponding secondary container to function as a new primary container.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial automation is an important feature of today's industrial processing plants. There is a need for industrial automation systems to continually provide greater flexibility in the implantation and operation of industrial automation systems.

Figure 1:
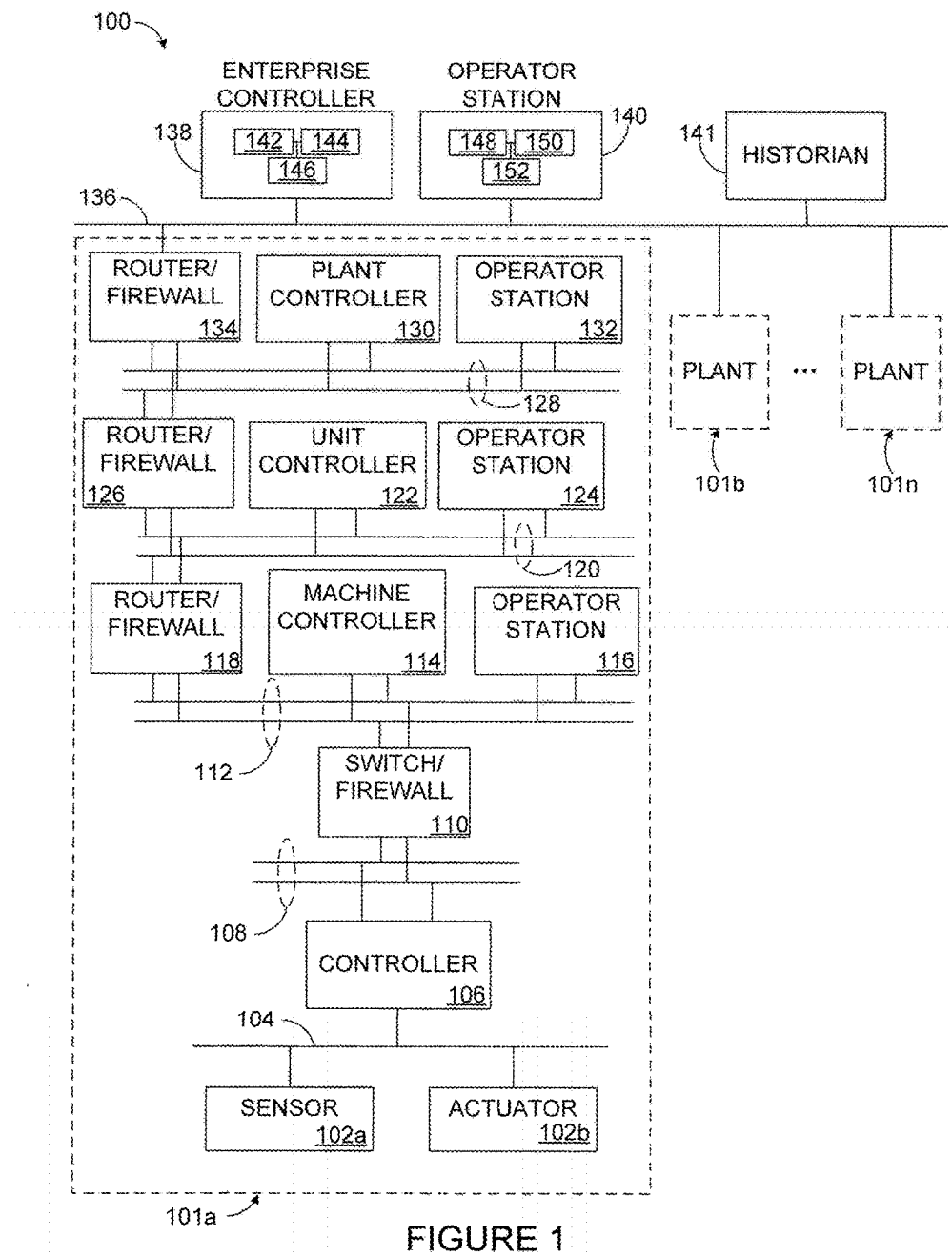
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Over time, a need or desire to upgrade one or more components in an industrial process control and automation system develops. This is true for distributed control system (DCS) operations as well as other systems. With the substantial base of installed automation devices already existing in numerous industrial process control and automation systems there is a need to adapt existing automation devices that were developed for OS (operating system) task or process/thread-based architecture to more modern architecture. An example of modern architecture is software container architecture, which is a form of virtualization that allows for greater granularity and segmentation of software modules, thereby improving reliability, security, resources utilization, and engineering efficiency.

Containers in container architecture provides isolation within which applications can be instantiated and executed. Typically, containers virtualize CPU, memory, storage, and network resources at the OS-level, thereby providing a sandboxed view of the OS logically isolated from other applications. Container architecture is applied herein to control devices employed in industrial automation systems. In industrial automation systems, unique requirements exist due to the very nature of industrial process automation systems compared to, for example, traditional information technology systems. For example, real time execution requirements and highly deterministic requirements must be met for industrial automation systems. Further, control devices are often resource limited, such as limited memory and limited CPU, and resource utilization is a concern. In industrial automation systems, care must be taken as to how a container may be engineered and deployed into the system. Additionally, not only does a container and its instantiated applications need to be considered, but also the management and platform that supports the container. It is envisioned that some functions may be deployed and executed as containers, while other functions may be deployed and executed using different architecture, such as the existing architecture of an existing control device. Some applications may need intimate access to the hardware and there may be advantages to maintain a different architecture for these functions. However, other functions in the same control device may adapt to the container architecture.

Employing one or more containers in a control device allows the applications instantiated in the container to be abstracted from the hardware. Many industrial automation applications today run on the firmware of control devices. Moving applications to a container architecture allows for the container to run on available hardware in the control device, even if that hardware is different from control device to control device. The container architecture is flexible and may operate on the hardware that is available. Upon instantiating an application as a container, the application then becomes portable. Replication across multiple control devices becomes manageable.

Applying container architecture to control devices in an industrial automation system includes instantiating at least one of the following applications as a container: control execution algorithm, communication algorithm and or redundancy control algorithm. Each of the listed algorithms may be built, packaged, and instantiated as a separate container, or any combination of the listed algorithms may be built, packaged and instantiated as a single container. The container is implemented and executed in the control device. The existing control logic of the industrial control automation system need not be re-written, and operators can migrate to a new control device with enhanced capability without having to rewrite the control logic. Additionally, pre-existing control models may be adapted to containers without the control model being re-written Employing containers creates a more flexible control device able to move to next-generation type capabilities and provide a viable migration path. For example, Internet of things (IoT) applications such as alarm management, analytics, advanced predictive control may be moved to the edge or embedded in the control device in a sale and secure manner.

Containers further provide the opportunity to use a variety of software modules in the control device. Purchased software modules may be employed and not all require custom coding and generation. In an existing control devices, adapting to a container architecture provides the opportunity for software modules to be incorporated even though previously only software was that embedded in the control device by, for example, the manufacturer, could be available. The flexibility of the control device is increased while at the same time the run time provided by the control device is preserved. The preservation of run time is important because of the limited resources typically found in existing processors of control devices. At the same time, containers provide isolation so proprietary modules may be employed using a container and then deployed while at the same time maintaining the confidentiality of the proprietary module. The benefit of the proprietary software is achieved on an existing control device while maintaining the secrecy of the proprietary software. Containers further provide a new method to simplify with greater granularity on-process software upgrades and migrations. Control automation software may be packaged and tested and then be available to run on different types of control devices as needs arise.

The container architecture may be utilized in DCS operations with the control execution and redundancy that are unique to DCS. Programmable logic control (PLC) systems have control engines and redundancy that are different from that in a DCS.

The container is abstracted away from the operating system and the hardware. Therefore, to execute applications instantiated as container, the control device needs to have a platform able to service and support container architecture. The platform is the infrastructure holding the containers. Of the existing or future control devices, some of the control devices have such platforms and would be eligible to adaptation to a container architecture. New control devices can be designed to support container architecture and be designed with a suitable platform to support the containers. The platform would provide resources supporting the containers, especially those functions that have been abstracted from the container. The platform provides the container run time and virtualization services to the containers. Any platform that supports the container run time maybe used to support the containers described herein.

For example, the platform would need to provide communication services. The platform would also need to provide scheduler services to ensure that the process execution exercising the control functions operates in a real time manner. The platform would need to provide communication services between two or more containers running on the same hardware platform. On a given controller, there may be more than one container. Each container provides isolation but at the same time, the applications may need to communicate with one another. The platform provides such communication services. The platform is the container run time onto which the containers are deployed. The container is associated with the platform and the platform provides the services to start the container, stop the container, schedule the container and so on.

In one embodiment, the control engine, such as control execution environment (CEE), that is currently present in today's control devices and operated with previous architecture is now packaged and instantiated as a container and deployed with the platform in the control device. In another embodiment, the control function and a communication application layer are packaged as a stand-alone modular container. In a particular control device such as the Honeywell C300 control device, the control function is CEE. Redundancy management may be included in the container so that each control container is monolithic and drives to its own atomic cleanpoint. At a more detailed level and with reference to CEE, a container may be packaged with CEE Control Kernel foreground; CEE Control Kemal, background (parameter access task); CEE Control Functions; Control Data Access (CDA); Notification Generator; CDA Responder Object Adapter; CDA Initiator Object Adapter; I/O Manager; and CEE Redundancy Management.

In another embodiment, employing virtualization for control, an exemplary container would be instantiated with control and communications functions.

Communications, including peer, supervisory, and I/O, are included in either the container or the platform, as discussed above, so that control execution containers can communicate with each other whether on the same node or on different physical nodes using an application communication layer such as Control Data Access, Universal Control Network Communication (UCNC) or OPC UA. Further, the control execution notification generator, which provides alarms and events, needs to execute in proximity with the control functions. Also, the I/O management includes shed management, I/O initialization on hot, warm, and cold start, output distribution in coordinated coherent manner to prevent retrograde outputs and proper loop latency and other timing management.

Figure 2A:
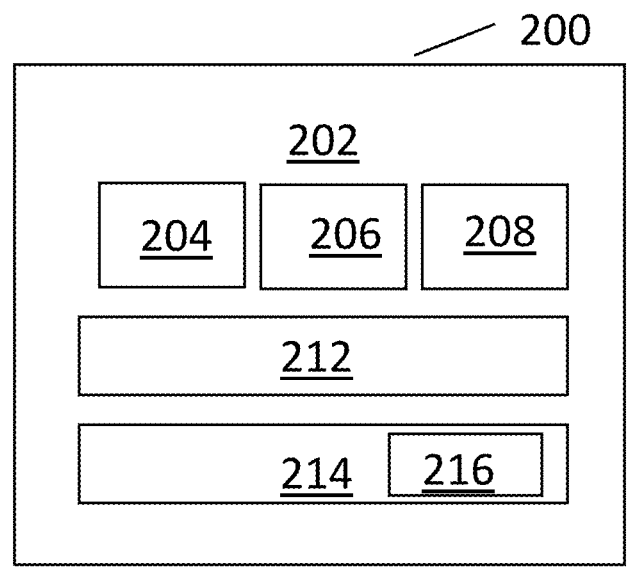
FIGS. 2a and 2b show exemplary container-based architecture of a control device according to an embodiment where a platform supporting containers is internal to a processor of the control device.
Figure 2B:
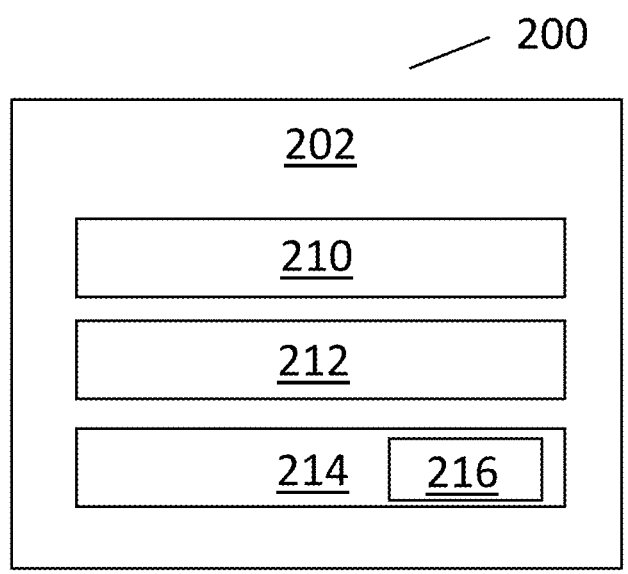

Turning to FIG. 2a, control device 200 has processor 202 having infrastructure 214 including microprocessor, memory, and network interface 216, and having platform 212 where platform 212 supports and services container architecture. FIG. 2a shown an embodiment comprising three containers 204, 206, and 208. Each container 204, 206, 208 may have separate instantiated applications. For example, container 204 is instantiated with at least control execution, container 206 is instantiated with at least communication, and container 208 is instantiated with at least redundancy management. FIG. 2b shows control device 200 having processor 202 in turn having infrastructure 214 and platform 212 where platform 212 supports and services container architecture. In one embodiment, platform 212 is configured to provide one of communication services, scheduler services, or redundancy management services to the container(s). In another embodiment, platform 212 provides communication services, scheduler services, and redundancy management services to the container(s). However, FIG. 2b shows an embodiment where a single container 210 is instantiated with multiple applications. For example, in one embodiment container 210 is instantiated with the application functions of control execution and communication and redundancy.

Turning now to high availability for container-based control execution, a set of nodes, for example control devices, execute a set of containers where each container is backed up so that in the event of a failure the primary mission may be continued. In other words, a set of nodes such as the control devices or virtual servers, have container platforms capable of supporting container architecture and that host one or more containers. The container platforms are part of a high availability management network that connects the set of container platforms together provide the container run times of those platforms. Through the high availability management network, the platforms communicate with one another so that the status of each is known. For example, which containers are running on each specific node and which containers across the nodes are running which specific applications are known. In the event of a failure of one specific node, the remaining container platforms detect the failure through the intercommunication of the container platforms via the high availability management network. The specific node that is in failure and the specific containers of that node are detected via the high availability management network. If an entire node has failed, the containers assigned to the failed node are redistributed among the remaining operational nodes via the high availability management network. The redistributed containers continue to execute their function on the new host node. If only one or some of the containers of a specific node has failed, the container platforms detect the failure via the intercommunication through the high availability management network. The functions of the failed containers may be redistributed to other containers or nodes so that operations continue. High availability is provided since even if a node is in failure, remaining nodes with containers and container platforms that are not in a failed state may accept assignment and continue the functions of the failed node. For example, a control execution container function of a failed node may be executed instead by another control execution container of another node which is not in a failed state.

The high availability is achieved even though the nodes or platforms may not be all of the same type. In other words, the set of nodes may be heterogeneous. Different types of nodes may be networked together as a set, such as different generations of control devices, or perhaps an industrial computer, or a virtual platform. The nodes may be physical hardware or may be virtual nodes. Virtual nodes are particularly effective to operate during the time it takes to repair a physical hardware node. Similarly, different platforms may be networked together. Because of the container architecture used and the abstracting of the containers from the hardware, a heterogeneous mixture of platform types is networked to function together.

High availability though the orchestration of a set of nodes with platforms supporting container architecture in a process control setting requires a high degree of determinism and care that the underlying process being controlled is not affected. For example, the orchestration for high availability in a control setting redistributes and continues the functions of a failed container or node within a few hundred milliseconds of the container or node failing.

As mentioned previously the nodes themselves may be physical hardware or virtual, or a set of nodes may be a mix of physical hardware or virtual environments. Nodes may be physical embedded control devices with platforms to support container architecture and provide container run time, and within a set of nodes there can be virtual infrastructure with a virtual server, which can allow for additional capacity. Furthermore, different generations of control devices may be part of the set of nodes. Different manufactures of control devices may be part of the set of nodes. The use of containers, where the applications are not run on the operating system of a controller, but instead is supported by a platform, and the abstracting of the applications instantiated in the containers from the hardware provides the opportunity for a heterogeneous set of nodes to be employed.

In previous systems, code and applications were imbedded within hardware and the hardware was integral to the executing of functions. With the container-based architecture herein, functions to be executed are in a containerized application and the hardware provides a container runtime though a platform onto which a container is deployed. The platforms support redundancy so that if a node fails, a second node starts one or more containers of the second node and synchronized the data from where the failed node left off and transfers the state. The platform is able to start, host, package applications, and provide services to run the containerized applications.

In addition, the platforms within the nodes further provide I/O (input/output) data devices such as to the support container need to have access to I/O data. The platforms may be networked to and I/O network, which may be a primary and secondary network, to provide communication services between the I/O network and the containers. If a container is redeployed to a different node, the platform of the new node is also connected to the I/O network and is therefore able to reconnect to the newly started container to the I/O network so that the container may continue to fulfill the control mission.

Figure 3:
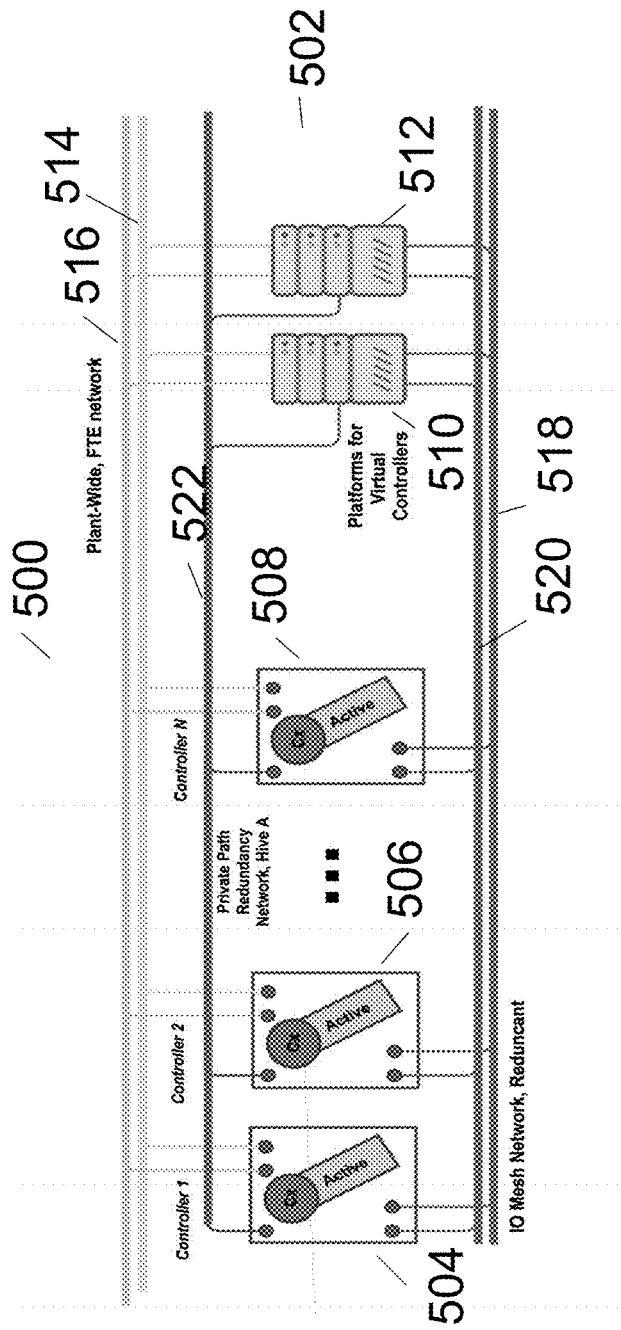
FIG. 3 shows a heterogeneous set of control devices each connected to multiple networks.

Turning to FIG. 3, a portion of an industrial control automation 500 has heterogeneous set of control nodes 502 containing several physical control devices 504, 506, and 508 and several virtual servers 510, and 512. Each node in set 502 is connected to a primary control network 514 and a secondary control network 516 where the control networks are fault tolerant ethernet networks. Among other things, the control networks allow for the uplinks to human machine interfaces. Each node in set 502 is further connected to a primary I/O mesh network 518 and a secondary I/O mesh network 520. Each node in 502 have equal access to the I/O through the primary I/O mesh network 518 and the secondary I/O mesh network 520. Each node in set 502 is additionally connected to a high management network 522 which connects the nodes in set 502 to one another.

The high management network 522 allows for an initial synchronization of the control environments of the set of nodes 502 by polling the mesh of control hardware to determine the capacity of each of the nodes. A load calculation for each control container is performed and the results are fit against the available resources of a node, such as memory and CPU. Based on this analysis, containers are initially assigned to nodes, and in a redundant system, both the primary containers and the secondary containers are initially assigned. Each control container may perform a trickle synchronization as described in U.S. Pat. No. 6,272, 386. Synchronization maintenance may continue, and each container executes to an atomic clean point, at which time the primary container communicates its changed state to the secondary container. It is not necessary that each container drive to the same synchronous atomic clean point as the container itself will be complete with regards to its control mission, its I/O relationships and its peer relationships. For failover, each node which is acting to provide backup capabilities polls the primary node periodically to verify that it remains healthy and is able to detect primary node hardware failure. When this happens, the secondary function is made primary and takes control of the I/O. The secondary can initiate a failover on a per-container basis as opposed to a per node basis. In this way, a software fault in any one container is compensated for by redundancy with a secondary container which can resolve the failure and maintain the core control mission.

Figure 4:
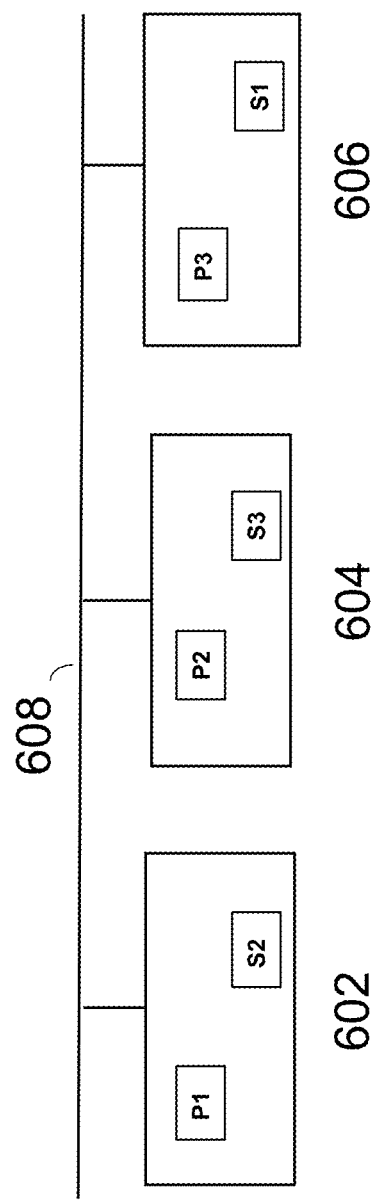
FIG. 4 shows an exemplary system of three control devices each connected to a high availability management network.

Turning to FIG. 4, three control devices, 602, 604 and 606 are each connected to a high availability management network 608. In this embodiment, the nodes are shown as physical control devices, but the invention is not limited to only physical control devices and the overall set of nodes may include virtual servers. Furthermore, due to the use of containers, the set of nodes may be a heterogeneous set of nodes, allowing for different types of control devices to be included in the set of nodes.

In FIG. 4, each control device has at least two types of containers instantiated with one or more applications, and a platform to host the containers and provide a container run time. It is important to note that FIG. 4 is only one possible embodiment. Additional control devices may be included, and not every control device has a primary container. Some control devices or nodes may be included to provide extra capacity when needed. At a first point in time, control device 602 is assigned primary responsibility for container P1, control device 604 is assigned primary responsibility for container P2 and control device 606 is assigned primary responsibility for container P3. Control device 602 is also assigned secondary responsibility for container S1, control device 604 is assigned secondary responsibility for container S2 and control device 606 is assigned secondary responsibility for container S3. P1 and S1 form a first redundancy relationship, P2 and S2 form a second redundancy relationship and P3 and S3 form a third redundancy relationship.

Figure 6:
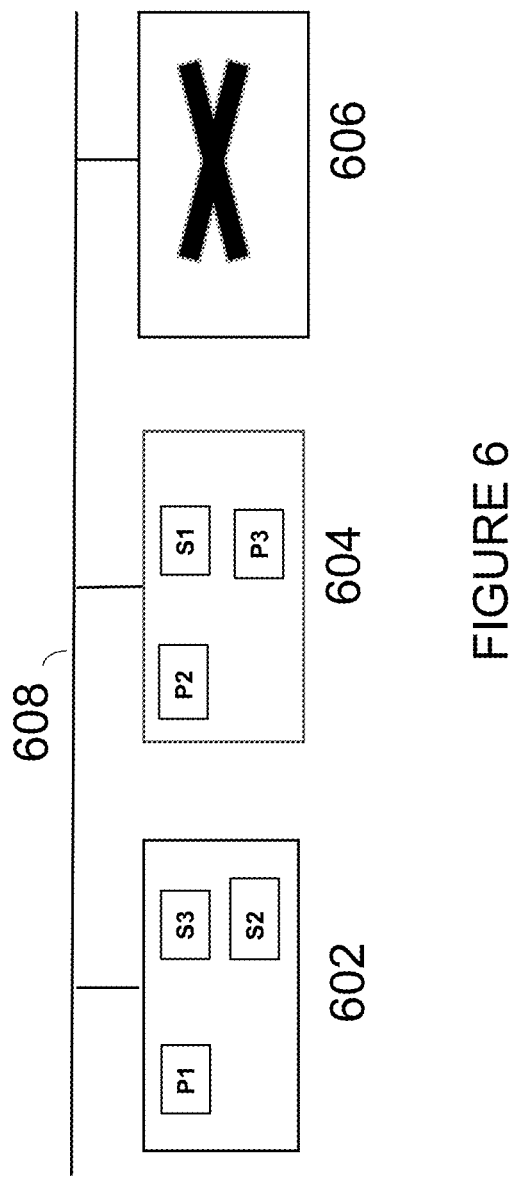
FIG. 6 shows the reassignment of containers of the failed state control device of FIG. 5 and the elevation of a secondary container to a primary container of a redundant pair.

In the redundancy relationships, the redundancy has an initial synchronization as to the initial state of the containers and subsequently, any changes that happen as the control is being executed are sent from the primary to the secondary container so that the secondary container continually has an up-to-date state so if the primary fails the secondary can immediately take over and become the new primary. Thus, the synchronization of the data between the primary container and the secondary container in a redundant pair of containers is maintained during operation. FIG. 6 shows the control devices and containers in steady state.

Figure 5:
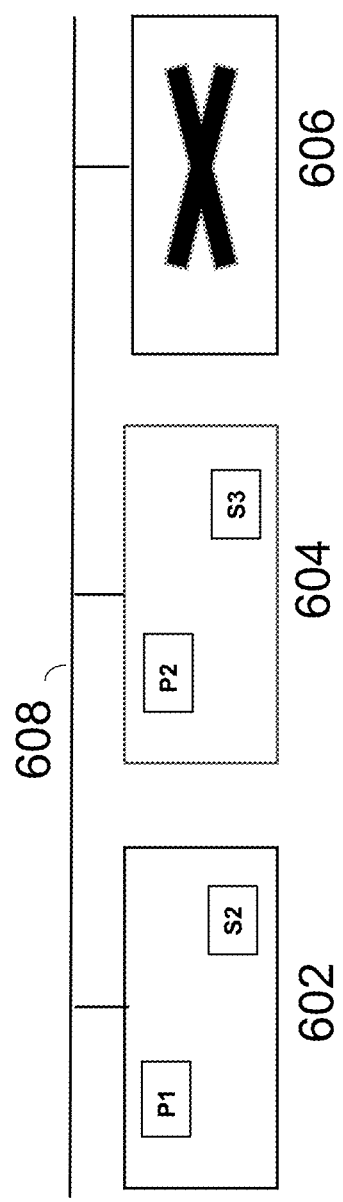
FIG. 5 shows where one of the control devices of FIG. 4 is in a failed state.

FIG. 5 shows the situation where control device 606 has moved to a failed state. Although FIG. 5 shows a node, control device 606 as a failed state, the disclosure here is also directed to the situation where only a container is in a failed state as opposed to the node. For example, a software fault may occur where only one or more contains have failed but the nodes themselves have not failed.

FIG. 6 shows the high availability of the system as control devices 602 and 603 through high management network 608 detect that control device 606 is in a failed state and that the primary container P3 of control device 606 is no longer available. The secondary container S3 of control device 602 takes over for unavailable primary container P3 of control device 606. However, primary container P1 in control device 602 no longer has an available redundancy partner since control device 606 is in a failed state. P1 of control device 602, through its host platform and high management network 608, queries the remaining control devices including control device 604 to determine available capacity sufficient to start up a container that contains the secondary partner to P1 and then to synchronize the data. In this example, control device 604 has sufficient capacity and sends a message through its platform and network 608 to P1 of control device 602. The platform of control device 604 is instructed to start up an instance of container S1 and synchronize the data with container P1 of control device 602. Multiple control device failures may be tolerated provided there is sufficient capacity in the remaining control devices to start containers needed and synchronize data. Containers, as part of their description or definition can specify what are the requirement of that container, which could be memory, CPU and the like. In that way, the platform can detect whether sufficient capacity exists in a control device to initiate a given container. The platform also keeps track of the amount of available capacity in the control device to be able communicate that amount to other platforms in other control devices. Therefore, instructions to initiate a container will only be provided to control devices having sufficient capacity to start the container and synchronize the data and maintain the on-going data synchronization. The high management network 608 provides the communication between the platforms of all of the control devices and allows for the high availability of the overall system. With the platforms of the different control devices communicating with one another, the system can detect when one control device is failed and detect which of the remaining control devices have sufficient capacity to take over which of the containers on the failed control device. In this way multiple failures may be tolerated, to an extent beyond a traditional redundancy system. Because containers are abstracted from the hardware, containers provide the ability to operate on a heterogeneous set of platforms. One example of the importance of this feature is when a set of platforms may include both the control devices and a large capacity on a virtual server. While a plant engineer may not want to run continuously on a virtual server, when there are a large number of failures, the virtual server may run the containers during the time it takes to repair the faults of the physical control devices.

Figure 7:
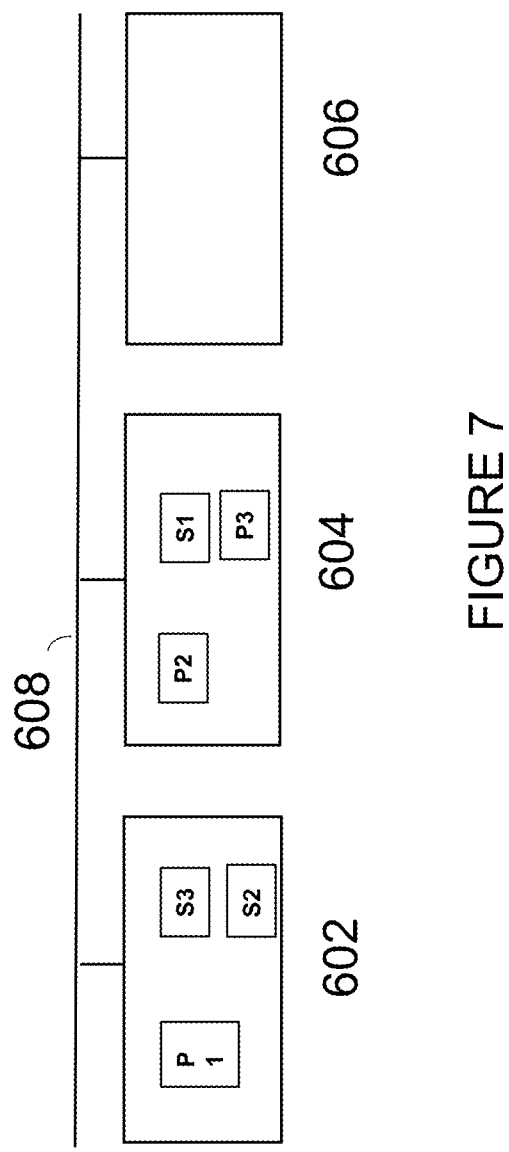
FIG. 7 shows the return of the control device that was in a failed state in FIGS. 5 and 6.
Figure 8:
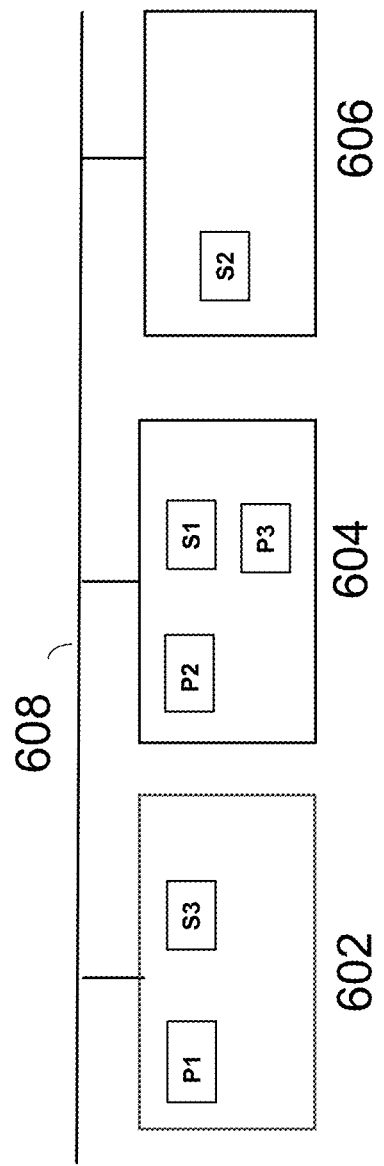
FIG. 8 shows redistribution of containers across control devices.
Figure 9:
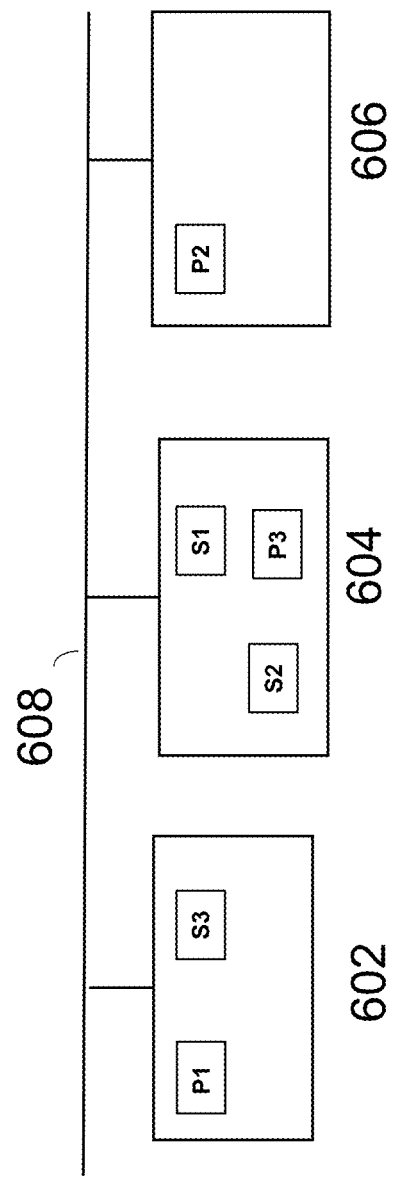
FIG. 9 shows elevation of a redistributed secondary container of a redundant pair to the primary container.
Figure 10:
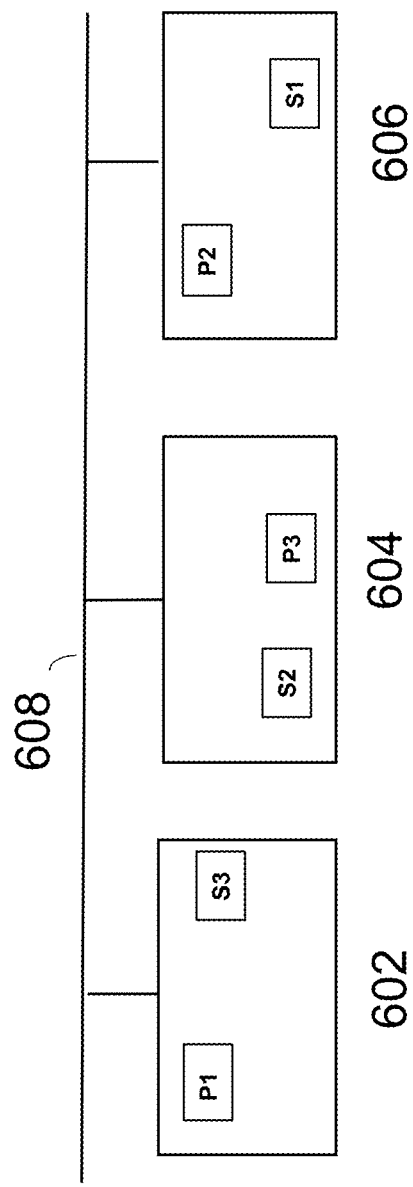
FIG. 10 shows load balancing across a set of control devices.

FIG. 7 shows where control device 606 has been repaired and has just been removed from a failed status. Control device 606, having been just returned to service, is not running any containers. With the return of control device 606, the is a need to balance the load of all the control devices on the system FIG. 8 shows the start up and synchronization of secondary container S2 on control device 606. FIG. 9 shows that after start-up and synchronization of the data of container S2 on control device 606, container S2 on control device 606 is changed to become the primary container, P2 on control device 606, and the primary container P2 on control device 604 is changed to become the secondary container S2 on control device 604. In this way, each control device 602, 604, and 606 has a primary container. FIG. 10 shows the continued load balancing across the control devices as secondary container S1 is started on control device 606 and synchronized with secondary container S1 on control device 604. Upon completion of the synchronization, secondary container S1 on control device 604 is shut down and secondary container S1 on control device 606 continues to provide the redundant partner to primary container P1 on control device 602.

The FIGS. 3 through 10 illustrate a system having a one to many type of redundant system, that advantageously uses containers to fulfil multiple control missions. The multiple control missions can be backed up by one or more hardware devices with the full ability to account for node failover to multiple control devices in a mesh. The mesh then provides new backups among available hardware.

EMBODIMENTS

A first embodiment is a high availability industrial control automation system comprising: a set of nodes wherein each node comprises a processor configured with a platform supporting container architecture; each node comprising one or more containers instantiated with at least one application function selected from control execution, communication, and redundancy management; and a high availability management network connecting the platforms of the nodes in the set of nodes. Another embodiment is the first embodiment wherein the set of nodes is a heterogeneous set of nodes. Another embodiment is the first embodiment wherein the set of nodes comprises physical control devices and virtual servers. Another embodiment is the first embodiment further comprising a primary control network and a secondary control network wherein each node is connected to both the primary control network and the secondary control network. Another embodiment is the first embodiment further comprising a primary I/O network and a secondary I/O network wherein each node is connected to both the primary I/O network and the secondary I/O network. Another embodiment is the first embodiment wherein at least a first container of a first node and a second container of a second node are present in a redundant relationship. Another embodiment is the first embodiment wherein the platform enables container runtime services to the containers.

A second embodiment is a high availability industrial control method comprising: providing a set of nodes, each node comprising a processor configured with a platform supporting container architecture and each node comprising one or more containers instantiated with at least one application function selected from control execution, communication, and redundancy management, wherein each node is connected to a high availability management network; detecting a failure state of one or more nodes by communications though the high availability management network;

identifying the containers assigned to the one or more nodes detected in a failure state; determining available capacity in the remaining nodes by communications though the high availability management network; redistributing the containers previously assigned to the one or more nodes detected in a failure state to one or more remaining nodes based on the determined available capacity; and automatically starting the redistributed containers. Another embodiment is the second embodiment further comprising detecting I/O connections assigned to the one or more nodes detected in a failure state and reassigning the I/O connections along with the redistributing of the containers. Another embodiment is the second embodiment wherein the set of nodes are a heterogeneous set of nodes. Another embodiment is the second embodiment wherein the set of nodes comprise physical and virtual nodes. Another embodiment is the second embodiment wherein the containers include redundant pairs of containers where each member of the pair is assigned to a different node. Another embodiment is the second embodiment further comprising determining which of the containers assigned to the one or more nodes detected in a failure state are primary containers in a redundant pair of a primary container and a secondary container and elevating the corresponding secondary container to function as a new primary container. Another embodiment is the second embodiment further comprising detecting a change in status of a node from a failure state and rebalancing the distribution of containers across nodes in a non-failure state. Another embodiment is the second embodiment wherein the determining available capacity comprises communicating predetermined container requirements though the high availability management network. Another embodiment is the second embodiment wherein the automatically starting the redistributed containers further comprises automatically synchronizing data from a remaining member of the redundant pair of containers.

A third embodiment is a high availability industrial control method comprising: providing a set of nodes, each node comprising a processor configured with a platform supporting container architecture and each node comprising one or more containers instantiated with at least one application function selected from control execution, communication, and redundancy management, wherein each node is connected to a high availability management network; detecting a failure state of one or more containers by communications though the high availability management network; identifying the failed container assigned to the one or more nodes and identifying the capacity requirements of the failed container; determining available capacity in the nodes by communications though the high availability management network; redistributing the one or more failed containers to one or more nodes based on the determined available capacity and the capacity requirements of the one or more containers; and automatically starting and synchronizing the redistributed one or more containers. Another embodiment is the third embodiment wherein the set of nodes comprise a heterogenous mixture of nodes. Another embodiment is the third embodiment further comprising detecting I/O connections assigned to the one or more containers detected in a failure state and reassigning the I/O connections along with the redistributing of the containers. Another embodiment is the third embodiment further comprising determining which of the one or more containers in a failure state are primary containers in a redundant pair of a primary container and a secondary container and elevating the corresponding secondary container to function as a new primary container.

What is claimed is:

1. A high availability industrial control automation system comprising:
   a. a set of nodes wherein each node of the set of nodes comprises a processor configured with a platform supporting container architecture; each node of the set of nodes comprising one or more containers, wherein each of the one or more containers is instantiated with one or more application functions selected from control execution, communication, and redundancy management;
   b. a high availability management network connecting platforms of nodes in the set of nodes, wherein the high availability management network is configured to:
      synchronize control environments of the set of nodes to determine a first load capacity of each node of the set of nodes;
      assign the one or more containers in a redundant system to the set of nodes based on the determined first load capacity;
      detect a failure state of a first node among the set of nodes, wherein the first node comprises at least two types of containers among the one or more containers instantiated with the one or more application functions;
      identify the one or more containers assigned to the first node that is detected in the failure state
      determine if the one or more containers assigned to the first node detected in the failure state comprises a primary container (P1, P2, P3); and
      elevate a corresponding secondary container (SI, S2, S3) to function as a new primary container, wherein the corresponding secondary container initiates a failover on a per-container basis as opposed to a per node basis, to resolve the failure state in the first node thereby compensating for by redundancy;
      determine a second load capacity in one or more remaining nodes of the set of nodes;
      redistribute the corresponding secondary container (S1, S2, S3) and rest of the one or more containers that were previously assigned to the first node to the one or more remaining nodes of the set of nodes based on the determined second load capacity, wherein the one or more remaining nodes of the set of nodes are different from the first node; and
      automatically start the redistributed corresponding secondary container (S1, S2, S3) and the rest of the one or more containers.

2. The system of claim 1, wherein the set of nodes is a heterogeneous set of nodes.

3. The system of claim 1, wherein the set of nodes comprises physical control devices and virtual servers.

4. The system of claim 1, further comprising: a primary control network and a secondary control network wherein each node of the set of nodes is connected to both the primary control network and the secondary control network.

5. The system of claim 1, further comprising: a primary I/O network and a secondary I/O network, wherein each node of the set of nodes is connected to both the primary I/O network and the secondary I/O network.

6. The system of claim 1, wherein at least a first container of the one or more containers of the first node and a second container of the one or more containers of a second node of the set of nodes are present in a redundant relationship.

7. The system of claim 1, wherein the platform enables container runtime services to the one or more containers.

8. A high availability industrial control method comprising:
   a. providing a set of nodes, each node of the set of nodes comprising a processor configured with a platform supporting container architecture and each node of the set of nodes comprising one or more containers instantiated with one or more application functions selected from control execution, communication, and redundancy management, wherein each node of the set of nodes is connected to a high availability management network;
   b. synchronizing control environments of the set of nodes to determine a first load capacity of each node of the set of nodes;
   c. assigning the one or more containers in a redundant system to the set of nodes based on the determined first load capacity;
   d. detecting a failure state of a first node among the set of nodes by communications through the high availability management network, wherein the first node comprises at least two types of containers among the one or more containers instantiated with the one or more application functions;
   e. identifying the one or more containers assigned to the first node that is detected in the failure state;
   f. determining if the one or more containers assigned to the first node detected in the failure state comprises a primary container (P1, P2, P3);
   g. elevating a corresponding secondary container (Si, S2, S3) to function as a new primary container, wherein the corresponding secondary container initiates a failover on a per-container basis as opposed to a per node basis, to resolve the failure state in the first node thereby compensating for by redundancy;
   h. determining a second load capacity in one or more remaining nodes of the set of nodes by communications through the high availability management network;
   i. redistributing the corresponding secondary container (S1, S2, S3) and rest of the one or more containers that were previously assigned to the first node to the one or more remaining nodes of the set of nodes based on the determined second load capacity, wherein the one or more remaining nodes of the set of nodes are different from the first node; and
   j. automatically starting the redistributed corresponding secondary container (S1, S2, S3) and the rest of the one or more containers.

9. The method of claim 8, further comprising: detecting I/O connections assigned to one or more nodes of the set of nodes detected in the failure state and reassigning the I/O connections along with the redistributing of the corresponding secondary container (Si, S2, S3) and the rest of the one or more containers that were previously assigned to the first node.

10. The method of claim 8, wherein the set of nodes are a heterogeneous set of nodes.

11. The method of claim 8, wherein the set of nodes comprise physical and virtual nodes.

12. The method of claim 8, wherein the one or more containers include redundant pairs of containers where each member of each of the redundant pairs of containers is assigned to a different node of the set of nodes.

13. The method of claim 8, further comprising determining which of the one or more containers assigned to one or more nodes of the set of nodes detected in the failure state are primary containers in a redundant pair of the primary container and the corresponding secondary container and elevating the corresponding secondary container to function as the new primary container.

14. The method of claim 8, further comprising: detecting a change in status of a node of the set of nodes from the failure state and rebalancing a distribution of containers of the one or more containers across the set of nodes in a non-failure state.

15. The method of claim 8, wherein the determining the first load capacity comprises communicating predetermined container requirements through the high availability management network.

16. The method of claim 12, wherein the automatically starting the redistributed corresponding secondary container (S1, S2, S3) and the rest of the one or more containers further comprises automatically synchronizing data from a remaining member of the redundant pairs of containers.

17. A high availability industrial control method comprising:
   a. providing a set of nodes, each node of the set of nodes comprising a processor configured with a platform supporting container architecture and each node of the set of nodes comprising one or more containers instantiated with one or more application functions selected from control execution, communication, and redundancy management, wherein each node of the set of nodes is connected to a high availability management network;
   b. synchronizing control environments of the set of nodes to determine a first load capacity of each node of the set of nodes;
   c. assigning the one or more containers in a redundant system to the set of nodes based on the determined first load capacity;
   d. detecting a failure state of the one or more containers by communications through the high availability management network;
   e. identifying a failed container among the one or more containers detected in the failure state assigned to a first node among the set of nodes and identifying a second load capacity of the failed container, wherein the first node comprises at least two types of containers among the one or more containers instantiated with the one or more application functions;
   f. determining if the failed container assigned to the first node is a primary container (P1, P2, P3);
   g. elevating a corresponding secondary container (Si, S2, S3) to function as a new primary container, wherein the secondary container initiates a failover on a per-container basis as opposed to a per node basis, to resolve the failure state in the failed container of the first node thereby compensating for by redundancy;
   h. determining a third load capacity in the set of nodes by communications through the high availability management network;
   i. redistributing the corresponding secondary container (S1, S2, S3) and rest of the one or more failed containers to one or more remaining nodes of the set of nodes based on the determined third load capacity and a fourth load capacity of the one or more containers, wherein the one or more remaining nodes of the set of nodes are different from the first node; and
   j. automatically starting and synchronizing the redistributed corresponding secondary container (Si, S2, S3) and the rest of the one or more containers.

18. The method of claim 17, wherein the set of nodes comprise a heterogenous mixture of nodes.

19. The method of claim 17, further comprising: detecting I/O connections assigned to the one or more containers detected in the failure state and reassigning the I/O connections along with the redistributing of the corresponding secondary containers (Si, S2, S3) and the rest of the one or more failed containers.

20. The method of claim 17, further comprising: determining which of the one or more containers detected in the failure state are primary containers in a redundant pair of the primary container and the corresponding secondary container.

\* \* \* \* \*